March 17, 1936.   O. H. HASSELBAUM   2,034,233
IGNITION SYSTEM FOR AUTOMOBILES AND THE LIKE
Filed July 3, 1934
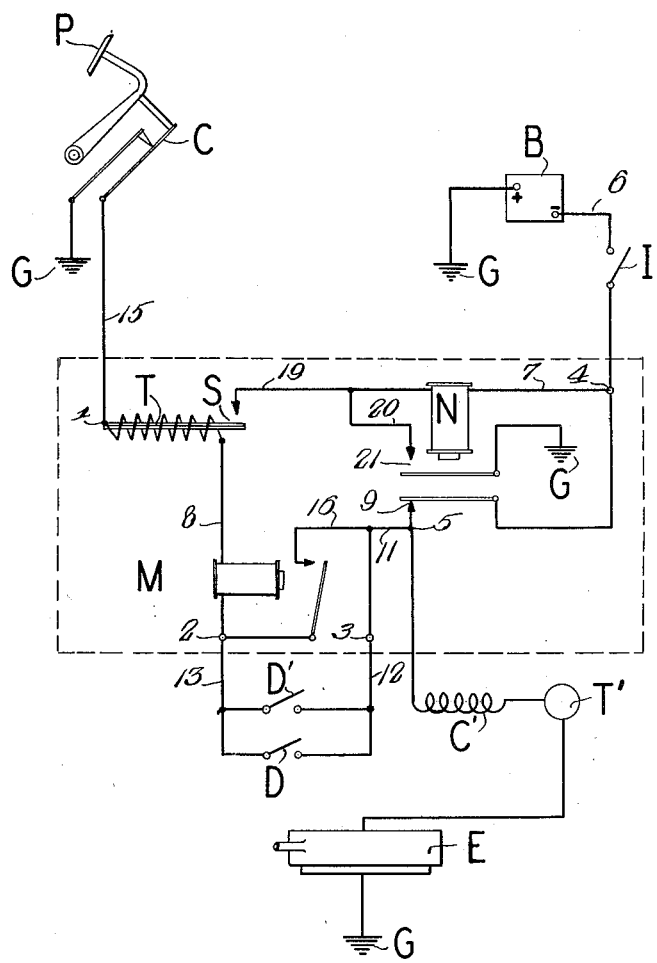

Patented Mar. 17, 1936

2,034,233

UNITED STATES PATENT OFFICE

2,034,233

IGNITION SYSTEM FOR AUTOMOBILES AND THE LIKE

Oscar H. Hasselbaum, Dorchester, Mass., assignor to Richard S. Robie, Melrose, Mass.

Application July 3, 1934, Serial No. 733,575

10 Claims. (Cl. 180—82)

Objects of the present invention are to render it impossible for a driver to get out of his car without stopping the engine, to make it impossible to start the engine until the doors are closed, and to accomplish these results economically with respect to both first cost and operating cost. Further objects are to prevent damage to doors and/or loss of baggage due to accidental opening of the doors of moving automobiles, busses, trucks, etc., by automatically stopping the vehicle when a door opens. Still other objects are to permit opening of the doors for a short interval of time, for loading or unloading passengers for example, without stopping the engine, and to increase this interval by depressing the clutch pedal or by some other means operable by the driver while in the driver's seat.

In one aspect the present invention involves an ignition system having automatic means for opening a switch in the ignition circuit in response to the opening of a door and/or movement of the operator in leaving the system. In the case of a passenger automobile the automatic means for opening the ignition switch may be responsive to the opening of any one or more of the doors of the car or to the driver leaving his seat or to the driver taking his hands off the steering wheel, the preferred control means comprising an electric switch associated with the door or the seat or the steering wheel to be actuated when the door is opened or the driver rises from his seat or releases his grasp of the steering wheel. In the case of busses and the like the switch may be associated with the door of the baggage compartment so that if the door opens accidentally in transit the engine will be stopped automatically.

In another aspect the invention involves the use of a slow-acting device for delaying the opening of the ignition circuit for a substantial interval of time following the closure of the door switch or other auxiliary switch. While this device may take any one of various forms it is preferably in the form of a thermostatic device which closes or opens the circuit a predetermined length of time after its heater circuit is closed.

In still another aspect the invention involves means such as another auxiliary switch associated with the clutch pedal so that the aforesaid interval of time may be increased in length, as for example when the driver opens the door to look backwards in backing a car. This additional auxiliary switch is also preferably arranged so that when opened before the door is opened the door switch is prevented from opening the ignition circuit, as for example when the door is opened momentarily to admit a passenger. The additional auxiliary switch may also be arranged to recondition the system during the aforesaid interval so that the ignition circuit is not opened at the end of the interval.

Other aspects of the invention will be evident from the following description of the illustrated embodiment shown in the accompanying drawing in which the figure is a diagrammatic view of the ignition system for an automobile.

The particular embodiment of the invention chosen for the purpose of illustration comprises an ignition circuit grounded at G and containing a source of current B, conductor 6, a manual switch I, a binding post 4, an electromagnetic switch 9, a binding post 5, an ignition coil C', a timing device T' and an internal combustion engine E. The switch 9 is controlled by a magnet N in the circuit G—B—6—I—4—7—19—S—T—15—C—G. The magnet N also controls a switch 20 21 in a branch circuit forming a part of the self-locking circuit G—B—6—I—4—7—N—20—21—G, so that when the magnet N is energized it remains energized until the switch I is opened. Connected in parallel with the ignition devices C'—T'—E is a branch circuit 11—12—13—2—8—15 which contains the auxiliary switches D and D' in parallel, the magnet M, the thermostatic heating coil T and the additional auxiliary switch C which is preferably controlled by the clutch pedal P. The magnet M is provided with a self-locking circuit 16 in parallel with the auxiliary switches D and D'.

The operation of the system is as follows. When the switch I is closed the ignition circuit is completed as follows: G—B—6—I—4—9—5—C'—T'—E—G. When one of the auxiliary switches D or D' is closed the magnet M and the thermostatic heater T are energized over the following circuits: G—B—6—I—4—9—5—11—3—12—D—13—2—M—8—T—1—15—C—G, thereby energizing magnet M and causing the thermostatic switch S to start toward closed position. When the magnet M is energized it locks itself closed over the circuit G—B—6—I—4—9—5—11—16—2—M—8—T—1—15—C—G, so that the magnet remains energized even though the switch D be opened immediately. After the predetermined time required for the thermostatic switch S to move to closed position the magnet M is energized over the following circuit: G—B—6—I—4—7—N—19—S—1—15—C—G. The energization of magnet N opens the ignition circuit at 9 and causes the magnet itself to be self-locked over the following circuit: G—B—6—I—4—7—N—

20—21—G. The energization of magnet N also breaks the locking circuit for magnet M, thereby permitting the switch of magnet M to open. At the same time that the magnet M is deenergized the heater T of the thermostatic switch is also deenergized, permitting the switch S to open.

In order to close the ignition circuit it is necessary to open the switch I momentarily to break the locking circuit of magnet M. When the ignition circuit is closed again at switch 9 the circuit of magnet M and the thermostat heater T is also reconditioned by the same switch, ready to be completely closed when either of the switches D or D' is again closed.

The clutch switch C may be utilized in various ways. If it be opened after the circuit of magnet M and heater T has been closed but before the thermostatic switch S closes it arrests the closing action of the thermostatic switch and deenergizes the magnet M, thereby opening its locking circuit 16, so that when the switch C is again closed the circuit of M and T remains open (assuming of course that the switches D and D' were closed only momentarily). Thus if a driver opens a door momentarily to close one of the switches D and D' momentarily, as for example to speak to some one or to let a passenger in or out, he may prevent the magnet N from opening the ignition circuit at 9 by depressing the clutch pedal momentarily during the interval of time required for the thermostatic switch S to close. The clutch switch C may also be used to prolong the time of closing of the thermostatic switch during a time when one of the switches D or D' remains closed, this function resulting from the fact that the current through the thermostatic heater is interrupted during the time the switch C is open. Thus if the driver opens the door to look backwards while backing up, thereby holding one of the switches D or D' closed, he may delay the time when the ignition circuit is opened at 9; and, by closing the door before the thermostatic switch is closed, the system may be restored to normal position without opening the ignition circuit at all. Indeed the opening of the ignition circuit by the switches D and D' may be delayed indefinitely by holding the switch C open.

From the foregoing it will be evident that the auxiliary switches D and D' may comprise door switches associated with either passenger or baggage doors, any suitable number of the switches being connected in parallel; or one of the switches may comprise a seat switch which is closed when the occupant rises; or one of the switches may comprise a steering wheel switch which is automatically closed when the operator releases his grasp of the steering wheel. It will also be understood that while the switch C is preferably associated with the clutch pedal it may be actuated in any suitable manner. The parts enclosed in the broken line rectangle are preferably built as a single unit which may be connected into the system at the five binding posts 1, 2, 3, 4 and 5.

It should be understood that the present disclosure is for the purpose of illustration only and that this invention includes all modifications and equivalents which fall within the scope of the appended claims.

I claim:

1. An ignition system for automobiles comprising an ignition switch, automatic means for opening the switch in response to the opening of a door, and means controlled by the clutch pedal for delaying the action of the first means.

2. An ignition system for automobiles comprising an ignition circuit including a source of current, ignition devices and an ignition switch, means including a magnet for controlling the ignition switch, an auxiliary switch controlling the magnet for opening the ignition switch, and means controlled by the clutch pedal for delaying the response of said magnet to the auxiliary switch.

3. An ignition system for automobiles comprising an ignition switch, automatic means for opening the switch in response to the opening of a door, means for delaying the action of the first means for a predetermined interval of time, and means controlled by the clutch pedal for further delaying said action.

4. An ignition system for automobiles comprising an ignition switch, an auxiliary switch for controlling the ignition switch, means including a slow-acting device for opening the ignition switch in response to the auxiliary switch after a substantial lapse of time, and means controlled by the clutch pedal for delaying the action of said means.

5. An ignition system for automobiles comprising an ignition circuit including a source of current, ignition devices and an ignition switch, a control circuit including a magnet for controlling the ignition switch and also including, in parallel with each other, a plurality of auxiliary switches for energizing the magnet to open the ignition switch, and means controlled by the clutch pedal for delaying the response of the ignition switch to the auxiliary switches.

6. An ignition system comprising an ignition circuit containing ignition devices, a self-locking magnet for opening said circuit, a thermostatic switch for controlling said magnet, an auxiliary magnet having a self-locking circuit controlled by said first magnet for controlling said thermostatic switch, and auxiliary switches for controlling said thermostatic switch and auxiliary magnet.

7. An ignition system for automobiles comprising an ignition switch, means including a manually controlled auxiliary switch and a slow-acting device for opening the ignition switch, a circuit controlled by the auxiliary switch for initially energizing the slow-acting device, a magnet in said circuit, and a locking switch controlled by the magnet for maintaining said circuit closed after the auxiliary switch is opened, whereby the ignition switch is opened after a prolonged period in response to momentary actuation of the auxiliary switch.

8. An ignition system for automobiles comprising an ignition switch, means including an auxiliary switch and a slow-acting device for opening the ignition switch, a circuit controlled by the auxiliary switch for energizing the slow-acting device, a magnet in said circuit, a locking switch controlled by the magnet for maintaining said circuit closed after the auxiliary switch is opened, and a clutch-controlled switch for opening said circuit independently of said switches.

9. An ignition system for automobiles comprising an ignition switch, means including an auxiliary switch and a thermostatic switch for opening the ignition switch, a circuit controlled by the auxiliary switch for energizing the thermostatic switch, a magnet in said circuit, and a locking switch controlled by the magnet for maintaining said circuit closed after the auxiliary switch is opened, whereby the ignition switch is opened after a prolonged period in response to momentary actuation of the auxiliary switch.

10. An ignition system for a power plant having clutch-control means, comprising an ignition switch, remote-control means for closing the switch, means automatically responsive to movement of the operator in leaving the system for opening the switch, and means controlled by said clutch-control means for delaying the action of the second means.

OSCAR H. HASSELBAUM.